UNITED STATES PATENT OFFICE.

JOKICHI TAKAMINE, OF NEW YORK, N. Y.

PROCESS OF CONVERTING STARCHY MATERIAL INTO SUGAR.

975,656.  Specification of Letters Patent.  Patented Nov. 15, 1910.

No Drawing.  Application filed January 20, 1906. Serial No. 297,039.

*To all whom it may concern:*

Be it known that I, JOKICHI TAKAMINE, a subject of the Emperor of Japan, residing in the borough of Manhattan, city and State of New York, have invented and discovered a new and useful Improvement in Processes of Converting Starchy Material into Sugar, and in order that those skilled in the art may understand and practice the same I give the following specification.

My invention relates, in general, to processes for converting starchy material into sugar, and more specifically to such processes performed as a preliminary step in the manufacture of spirituous or alcoholic liquors.

The objects of my invention are to improve the conversion of starchy material into sugar by obtaining a greater yield of saccharine material from a given quantity of starchy material than can be obtained by processes heretofore known and practiced, and to obtain the greater yield at less expense than that of the lower yields at present obtained; to obtain a practically complete conversion of all the starchy material employed, greater rapidity of conversion, and generally to obtain greater efficiency and economy in the process.

My invention may be applied to the conversion of starchy material of whatever nature or source; but for the purposes of this specification I will describe the same as applied to the conversion of the starchy material of cereals, and other grains or seeds, or of starchy roots or tubers.

In the processes of converting starchy material into sugar at present employed, the converting agent now generally employed is malt or malt diastase. This material, however, is relatively expensive, is not uniform in its character and effect and its saccharifying action is not thorough. Other converting agents, such for instance, as diluted acids, have been employed, but these, while much less expensive, are objectionable, and their use is practically prohibited by the fact that they have a corrosive action upon the apparatus, vessels, tanks, stirrers, &c., employed, not only attacking and seriously damaging the said apparatus, but also giving rise to highly objectionable products in the mass; and further require considerable time to effect the conversion.

My invention not only contemplates a great reduction in the cost of conversion and the attaining of more efficient and better results, but it also enables the use of the cheaper converting agents, such as acids, without the disadvantages and deleterious results above mentioned.

As illustrative of my invention, I give the following example: Of a given mass, say one hundred pounds, of starchy material to be converted, for instance corn or maize, I take from one-fourth to one-half of its weight, or twenty-five to fifty pounds, and macerate or percolate this portion with water, say from one hundred and twenty-five to two hundred and fifty pounds of water, at the ordinary temperature or slightly above. It will be understood that the starchy material or maize is cracked or coarsely ground before subjecting it to the process. The extract so obtained from the portion of the material to be treated is drawn off and collected for subsequent use as hereinafter described. The portion of the mass subjected to extraction as described above is returned to the remainder or unextracted portion of the grain, and the whole is charged into a cooker, preferably of the Henze type, with about twice its weight of acidified water, including the water which may remain in the extracted portion. The acid employed may be any acid which has a liquefying action upon starch. In the instance given, where maize or corn is the material treated, I prefer to use hydrochloric acid for this purpose in the proportion of .05 per cent. to .1 per cent. of the total weight of the water and grain in the cooker. The cooking is carried on for a period of from two to three hours under a pressure of about three atmospheres. After this period, or as soon as the starchy matter has been brought into a soluble or liquefied condition, or even after the inception of such condition, the acid is neutralized by the addition of a small portion of a weak alkali, such, for instance, as soda or lime. To the mass of starchy material is then added the extract obtained as described above. This extract upon being thoroughly mixed with the starchy material exerts a rapid, energetic and complete saccharifying action upon the same, and rapidly and completely converts the starch into sugars.

The extract obtained in the manner above described possesses energetic saccharifying properties with respect to liquefied starch or starch in process of liquefaction, but has no appreciable action on unliquefied starch. Upon being added to the cooked mass of starchy material treated in the manner as above described, it quickly and completely converts the starchy material into sugars. The sugars so formed may be separated from the mass in the usual way, and subjected to alcoholic or vinous fermentation for the production of alcohol in the ordinary and well known manner.

There is practically no waste material in my process, since, after the extraction of the separated portion of the starchy material, the starch present in said portion has not been affected or diminished by said extraction, and may be returned to the original mass, so that all the starch of said original mass is utilized and converted into sugars.

The proportions of material to be used to give the best results are readily ascertained by the skilled worker. The amount of acid required to cause liquefying of or making soluble a given amount of starch material will depend upon the kind of acid used, and also to some extent upon the particular kind of starch material operated upon. The amount of extract employed will depend upon the particular kind of starchy material extracted, and the degree of concentration of the extract.

It will be understood that I may, if desired, obtain an extract from material other than that which is to be converted into sugars, but have given the above description of my invention as the most convenient manner of carrying out the same. For instance, if desired, I may use material of the character specified, but from which the whole or a larger part of the starchy constituents have been removed—such as bran, shorts, middlings, &c., and extract the same and obtain thereby an extract to be used upon the starchy material to be converted after the same has been treated with dilute acid or other liquefying agent. Or a quantity of the extract may be kept on hand for use as required.

It will thus be seen that my invention results in obtaining conversion of starchy material into sugar at a minimum of expense and with more certainty and completeness, and without the disadvantages and objections inherent in processes now generally practiced. My invention further enables the use of dilute acids for the conversion without the disadvantages and objections which have heretofore attended their use. This is an important feature of advantage, owing to the lower cost of acids as compared with malt and similar diastases.

Having thus described my invention, the following is what I claim as new therein, and desire to secure by Letters Patent:—

1. The process of converting starchy material into sugar which consists in treating said starchy material with a starch liquefying agent to liquefy the starch, then adding to the liquefied starch a starch saccharifying agent having substantially no starch liquefying action.

2. The process of converting starchy material into sugar, which consists in treating said material with a weak acid at a suitable temperature to liquefy the starch present or convert the same into a soluble condition, and then treating said material with a starch-saccharifying material having substantially no starch liquefying action.

3. The process of converting starchy material into sugar, which consists in taking a portion of the starchy material to be converted, making a watery extract of the same, mixing the portion subjected to extraction with the unextracted portion, cooking the mass to liberate the starch, adding a weak acid to said mass to liquefy or convert the starch present into a soluble condition, and then adding the desired quantity of the aforesaid extract to the mass.

4. The process of converting starchy material into sugar, which consists in cooking said material to liberate its starch, treating said material with a weak acid at a suitable temperature to convert said starchy material into a soluble or liquefied condition, extracting a mass of grains or roots of the character specified, or of such material from which the whole or a portion of their starchy constituents have been removed, with water and adding the extract so obtained in desired quantity to the starchy material treated as above described.

5. The process of converting starchy material into sugar which consists in taking one-fourth to one-half of the mass of starchy material to be converted, extracting said portion with water, collecting the extract, mixing the extracted and unextracted portions together, adding thereto acidified water, cooking the mixture, neutralizing the acid, and then adding to the mass the aforesaid extract collected from the extracted portion of the starchy material.

JOKICHI TAKAMINE.

Witnesses:
MATHILDA HELEN ANDRES,
FLORENCE E. ALLEN.